Patented Aug. 31, 1926.

1,598,348

UNITED STATES PATENT OFFICE.

CHARLES M. HICKEY, OF TULSA, OKLAHOMA.

MEDICINAL FOOD.

No Drawing.    Application filed January 29, 1925.  Serial No. 5,631.

The present invention relates to the production of a new form of medicament, and has particularly to do with the employment of dried fruits or like substances in a unique manner as a vehicle for medicines.

The principal objection to many medicines, particularly to fastidious adults and to children, is the administration of such medicine. Most active medicines have unpleasant tastes. The medical and pharmaceutical fields have been enlarged from time to time to admit new processes for the "tasteless" administration of drugs, or for the concealment of the medicinal agent by obscuring the taste thereof in another substance more pleasing to the palate.

Ordinarily, the method of administration of unpleasant medicines, other than liquids, by the mouth, has been by placing around the medicinal dose a coating or shell or covering, the medicinal material being concealed within and the taste disguised by the external material thereover.

In the present invention this order of combination is reversed. A palatable substance, popular with every one, is selected as a vehicle, and the medicinal agent or compound is applied externally thereto in a manner not destructive to the structural characteristics of the vehicle nor affecting its physical appearance. The medicinal layer is widely distributed—over the whole of the vehicle—and thus may be said to be "diluted" so that its taste is lost in the predominating flavor of the vehicle. The medicament may be additionally so compounded with flavoring material that its taste is substantially that of the vehicle.

The objects of the invention, therefore, are:—

A new method of administering medicines;

The administration of medicines by employing a dried fruit or the like carrying upon the external portion thereof an active medicinal substance;

The employment of dried fruits or similar substances as vehicles for medicines without changing the physical characteristics of such vehicles;

A novel means of applying to a dried fruit or similar substance medicinal agents in such a manner that the presence of such medicinal agents is concealed;

A unique manner of coating dried fruits or similar substances with active medicinal agents so that the presence of such agents is obscured by the physical characteristics of the fruit employed;

The production of a stable medicinal substance comprising dried fruit and an active medicament in which the medicament aids in the preservation of the fruit; and A unique method of administering medicines by the employment of a vehicle having a characteristic taste and physical appearance to which has been externally applied medicinal agents in a manner that the physical characteristics of the fruit are unchanged, and the efficiency of such medical agents unimpaired.

These, and such other objects as may hereinafter appear, are obtained by the novel combination of ingredients and arrangement of the various steps employed in the production of the new system of medication, and in the product obtained by the process herein described, all of which is fully explained in the accompanying detailed description of the invention.

In order to provide an example showing the teachings of the invention, a description of the process will be given, such description being based upon the employment of raisins as a vehicle, raisins being a dried fruit which is admirably adapted to serve the purposes hereinafter indicated.

The required quantity of seedless raisins, of good quality, is obtained and these are thoroughly cleansed and dry sterilized.

The cleansed and sterilized raisins are placed in a revolving drum or cylinder, generally having a horizontal axis, where with constant rotation, the cleaned raisins are brought into contact with mucilage of acacia, U. S. P., and thinly coated therewith. The constant rotation of the raisins insures an even and thorough coating. Any tasteless and substantially colorless mucilage of a vegetable origin may be substituted for mucilage of acacia.

From this cylinder, after proper treatment, the raisins are removed to a drying room, where they are dried until most of the moisture has been evaporated from the mucilage of acacia. A thin evenly applied adherent coating remains, slightly moist, which coating is sufficiently dry so that when the raisins are placed in a second drum or cylinder, they do not unduly adhere one to another.

In a second cylinder, which is substantially like the first cylinder in its operation, and structure, a mixture of powdered phenolphthalein, U. S. P., and powdered citric acid U. S. P. is blown over the nearly dry raisins forming a coat thereover of these materials which is of equal distribution because in the first cylinder the mucilage of acacia was evenly distributed by the constant rotation of the cylinder. An impalpable powder should be used if it may be obtained. In practice it has been found very satisfactory to use 78 grains of phenolphthalein mixed with 8 grains of finely powdered citric acid for each pound of raisins.

Phenolphthalein is a splendid preservative and to this property is due the long life of raisins treated by this process as well as the permanency of the medicinal coating which I apply thereto. Citric acid serves to preserve the taste of the raisins, or to blend therewith, in fact, the citric acid appears to improve such taste, and concurrently to disguise the medicament which is employed. Citric acid is also used because of its well known effect as a cholagogue.

When the raisins coated with phenolphthalein and citric acid are removed from the second cylinder, they are quite white, due to the adherence thereto of the powdered phenolphthalein and citric acid, both of which are white. Immediately the raisins are transferred to a drying room and there allowed to become thoroughly dry.

After such drying, the raisins are removed to a third drum or cylinder which operates upon the same principle as the two previously mentioned drums or cylinders, and in said third cylinder and during its constant rotation, a spray of an intermixture of fluid extract of senna, U. S. P., and fluid extract of cascara sagrada aromatic, U. S. P., is played upon the raisins. The spray is arranged so that for every pound of raisins, the quantity of aromatic fluid extract of cascara deposited thereon is equivalent to two fluid drams, and the quantity of fluid extract of senna made a part of the coating is one fluid dram. The addition of the last named ingredients restores the natural color to the raisins.

Upon removal from the third drum, the raisins are again transferred to the drying room where, after proper drying, they are placed in boxes or other suitable containers and thus made ready for sale, distribution and shipment.

There are other methods in which phenolphthalein may be applied to a dried fruit as, for example, by its solution in alcohol and subsequent application to the fruit followed by drying. This method does not lead to uniformity of coating, is very expensive, and is apt to cause decomposition of any mucilaginous material employed, it being well known that the adhesive principle of acacia and other vegetable gums is arabin, which is incompatible with alcohol or alcoholic solutions.

It is readily evident that dosage may be simply and effectively controlled by the quantity of treated fruit administered. Likewise, the treated fruit, in that each one is small, readily lends itself to divided doses.

I claim:—

1. A medicinal substance comprising a vehicle of a dried fruit coated with a thin layer of a medicinal agent.

2. The combination with a dried fruit of a thin coating of laxative material, the taste of such laxative material being disguised by such fruit.

3. A means for administering medicine comprising dried fruit coated with a thin layer of a laxative agent, the taste of which agent is disguised during the consumption of such material and fruit.

4. As a new article of manufacture, a medicinal food comprising a dried fruit coated with a thin layer of a laxative material in a manner whereby the physical characteristics of the fruit including taste are preserved.

5. A new article of manufacture comprising a raisin coated with an adhesive, and a medicinal agent evenly and thinly distributed over such raisin and held thereon by said adhesive.

6. As a new article of manufacture, a raisin having an external coating of a dried mucilage and a thin layer of a laxative agent, the taste of the laxative agent being obscured by the addition of a flavoring material thereto adapted to blend with the flavor of the raisin.

7. As a new article of manufacture, a raisin evenly coated with a thin layer of mucilage, phenolphthalein, and citric acid, and the active agents of senna and aromatic cascara sagrada, the coating being applied in a manner whereby to provide a substantially transparent coating upon said raisin.

CHARLES M. HICKEY.